United States Patent
Kim et al.

(10) Patent No.: US 11,134,057 B2
(45) Date of Patent: Sep. 28, 2021

(54) SYSTEMS AND METHODS FOR CONTEXT-AWARE NETWORK MESSAGE FILTERING

(71) Applicant: The Boeing Company, Chicago, IL (US)

(72) Inventors: Hyun J Kim, Irvine, CA (US); Pape M. Sylla, Calabasas, CA (US)

(73) Assignee: The Boeing Company, Chicago, IL (US)

( * ) Notice: Subject to any disclaimer, the term of this patent is extended or adjusted under 35 U.S.C. 154(b) by 343 days.

(21) Appl. No.: 16/114,160

(22) Filed: Aug. 27, 2018

(65) Prior Publication Data

US 2020/0067880 A1    Feb. 27, 2020

(51) Int. Cl.
*H04L 29/06* (2006.01)
*B60R 16/023* (2006.01)
(Continued)

(52) U.S. Cl.
CPC .......... *H04L 63/0236* (2013.01); *H04L 63/02* (2013.01); *H04L 63/0227* (2013.01);
(Continued)

(58) Field of Classification Search
CPC . H04L 63/02; H04L 63/0263; H04L 63/0236; H04L 63/0227
See application file for complete search history.

(56) References Cited

U.S. PATENT DOCUMENTS 4,943,919 A * 7/1990 Aslin ................... G07C 5/006 340/500
6,854,063 B1   2/2005 Qu et al.
(Continued)

FOREIGN PATENT DOCUMENTS

EP    3 232 639    10/2017
EP    3 285 457    2/2018

OTHER PUBLICATIONS

I. Stellios, P. Kotzanikolaou, M. Psarakis, C. Alcaraz and J. Lopez, "A Survey of IoT-Enabled Cyberattacks: Assessing Attack Paths to Critical Infrastructures and Services," in IEEE Communications Surveys & Tutorials, vol. 20, No. 4, pp. 3453-3495, Fourthquarter 2018. (Year: 2018).*

(Continued)

*Primary Examiner* — Kari L Schmidt
(74) *Attorney, Agent, or Firm* — McDonnell Boehnen Hulbert & Berhoff LLP

(57) ABSTRACT

In an example, a non-transitory machine-readable medium has instructions, which, when executed by a processor of a machine, cause the machine to perform operations including: (i) receiving a plurality of network messages transmitted within a communication network, (ii) analyzing the network messages to determine network traffic information, and (iii) determining, based on the network traffic information, a current system context from among a plurality of system contexts. Each system context indicates a respective aggregate status of devices in the communication network. The operations also include (iv) selecting, based on the current system context, a set of filtering rules from among a plurality of sets of filtering rules, (v) applying the selected set of filtering rules to the network messages to determine a subset of network messages that are acceptable for the current system context, and (vi) forwarding each network message of the subset to a destination of the network message.

21 Claims, 13 Drawing Sheets

(51) Int. Cl.
*G06N 3/04* (2006.01)
*G06N 3/08* (2006.01)
*H04L 29/08* (2006.01)

(52) U.S. Cl.
CPC ...... *H04L 63/0263* (2013.01); *B60R 16/0231* (2013.01); *G06N 3/04* (2013.01); *G06N 3/08* (2013.01); *H04L 67/12* (2013.01)

(56) References Cited

U.S. PATENT DOCUMENTS

| | | | |
|---|---|---|---|
| 8,468,263 B2 | 6/2013 | Fagan et al. | |
| 9,494,933 B1 | 11/2016 | Jackson | |
| 9,948,611 B2 | 4/2018 | Kumar et al. | |
| 10,063,435 B2* | 8/2018 | Bush | H04L 63/02 |
| 10,650,621 B1* | 5/2020 | King | H04W 4/40 |
| 10,721,259 B2* | 7/2020 | Bush | H04L 43/028 |
| 2007/0115938 A1* | 5/2007 | Conzachi | B64F 5/60 370/352 |
| 2011/0218701 A1* | 9/2011 | Ric | H04L 63/0245 701/31.4 |
| 2012/0260180 A1* | 10/2012 | Herzberg | H04L 43/04 715/736 |
| 2013/0135109 A1* | 5/2013 | Sharon | B60K 28/06 340/576 |
| 2013/0304420 A1* | 11/2013 | Laval | G05B 23/0283 702/184 |
| 2015/0020152 A1* | 1/2015 | Litichever | H04L 63/08 726/1 |
| 2016/0044106 A1* | 2/2016 | Kjendal | H04L 43/12 709/225 |
| 2016/0156591 A1* | 6/2016 | Zhou | H04L 63/0263 726/13 |
| 2016/0320773 A1* | 11/2016 | Skaaksrud | H04W 64/003 |
| 2017/0279892 A1* | 9/2017 | Skaaksrud | H04W 4/02 |
| 2017/0289189 A1 | 10/2017 | Bush et al. | |
| 2017/0295031 A1 | 10/2017 | Bush et al. | |
| 2018/0054418 A1* | 2/2018 | El Defrawy | H04L 63/0245 |
| 2018/0102000 A1* | 4/2018 | Vala | G06N 3/08 |
| 2018/0220309 A1* | 8/2018 | Gomes | B60R 16/0231 |
| 2019/0050294 A1* | 2/2019 | Ferzli | G06F 11/1433 |
| 2019/0289038 A1* | 9/2019 | Li | G06N 20/00 |
| 2019/0311638 A1* | 10/2019 | Srinivasan | G08G 5/0021 |
| 2019/0386958 A1* | 12/2019 | Leconte | H04B 7/18506 |
| 2019/0394089 A1* | 12/2019 | Barrett | H04L 63/1416 |

OTHER PUBLICATIONS

Z. Gu, Z. Wang, S. Li and H. Cai, "Design and Implementation of an Automotive Telematics Gateway Based on Virtualization," 2012 IEEE 15th International Symposium on Object/Component/Service-Oriented Real-Time Distributed Computing Workshops, 2012, pp. 53-58. (Year: 2012).*

Altawy, Riham, and Amr M. Youssef. "Security, privacy, and safety aspects of civilian drones: A survey." ACM Transactions on Cyber-Physical Systems 1.2 (2016): 1-25. (Year: 2016).*

P. Tune, M. Roughan, "Internet Traffic Matrices: A Primer", in H. Haddadi, O. Bonaventure (Eds.), Recent Advances in Networking, 56 pages (2013).

Partial European Search Report prepared by the European Patent Office in application No. EP 19 19 3284.7 dated Nov. 14, 2019.

* cited by examiner

| SrcIDst | DST 1 | DST 2 | DST 3 | DST 4 | DST 5 | DST 6 | DST 7 | DST M |
|---|---|---|---|---|---|---|---|---|
| SRC 1 | 0.07 | 0.07 | 0.43 | 0.00 | 0.06 | 0.00 | 0.05 | 0.00 |
| SRC 2 | 0.00 | 4.09 | 6.42 | 0.06 | 7.07 | 4.42 | 1.59 | 0.02 |
| SRC 3 | 0.00 | 4.07 | 25.48 | 4.11 | 13.99 | 11.53 | 3.31 | 87.27 |
| ... | ... | ... | ... | ... | ... | ... | ... | ... |
| SRC N | 0.00 | 4.76 | 0.25 | 24.06 | 0.04 | 0.01 | 0.02 | 1.24 |

Figure 3A

| Port No. | % Per Port |
|---|---|
| 1 | 0.00 |
| 2 | 0.53 |
| 3 | 0.00 |
| 4 | 2.25 |
| 5 | 3.85 |
| 6 | 0.00 |
| 7 | 0.00 |
| 8 | 0.00 |
| 9 | 89.25 |
| 10 | 4.12 |
| ... | ... |
| 1024 | 0.00 |

Figure 3B

SYSTEMS AND METHODS FOR CONTEXT-AWARE NETWORK MESSAGE FILTERING

FIELD

The present disclosure generally relates to a system for filtering networks messages, and more particularly to systems and methods for filtering network messages based on a current system context.

BACKGROUND

In general, a firewall is a network security system that monitors and controls network messages transmitted in a communication network. For example, the firewall can apply a set of filtering rules to a network message and, based on the set of filtering rules, the firewall can either allow or block the transmission of the network message within the network. The firewall can thus help to control the network traffic within the network such that authorized communications are allowed and unauthorized communications are blocked. In this way, the firewall can help to, among other things, mitigate cyber security threats to devices within the network and/or prevent unauthorized access to network resources.

In some instances, it may be beneficial or desirable for the firewall to apply different filtering rules in different situations. For example, a context-aware firewall is a type of firewall that can apply different filtering rules based on situation information such as, for instance, a date, a time, a location, and/or a state of one or more devices in the network. The situational information may be referred to as a "system context." The context-aware firewall can be beneficial for systems in which the types of network messages that are authorized and/or unauthorized may change for the network in different situations.

SUMMARY

In an example, a method for filtering network messages in an aviation network based on a current system context is described. The method includes receiving, by a processor of a computer system, a plurality of network messages transmitted within an aviation network. The method also includes analyzing, by the processor, the plurality of network messages to determine network traffic information. The method further includes determining, by the processor and based on the network traffic information, a current system context from among a plurality of system contexts. Each of the plurality of system contexts indicates a respective aggregate status of a plurality of avionic devices in the aviation network. The method also includes selecting, by the processor and based on the current system context, a set of filtering rules from among a plurality of sets of filtering rules. The method further includes applying, by the processor, the selected set of filtering rules to the plurality of network messages to determine a subset of the plurality of network messages that are acceptable for the current system context. Additionally, the method includes forwarding, by the processor, each network message of the subset to a destination of the network message.

In another example, a system for filtering network messages in an aviation network based on a current system context is described. The system includes a memory that stores instructions, and a processor configured to execute the instructions to perform operations including: (i) receiving a plurality of network messages transmitted within an aviation network, (ii) analyzing the plurality of network messages to determine network traffic information, and (iii) determining, based on the network traffic information, a current system context from among a plurality of system contexts. Each of the plurality of system contexts indicates a respective aggregate status of a plurality of avionic devices in the aviation network. The operations also include (iv) selecting, based on the current system context, a set of filtering rules from among a plurality of sets of filtering rules, (v) applying the selected set of filtering rules to the plurality of network messages to determine a subset of the plurality of network messages that are acceptable for the current system context, and (vi) forwarding each network message of the subset to a destination of the network message.

In another example, a non-transitory machine-readable medium is described. The non-transitory machine readable medium has instructions embodied thereon, which, when executed by a processor of a machine, cause the machine to perform operations including: (i) receiving a plurality of network messages transmitted within a communication network, (ii) analyzing the plurality of network messages to determine network traffic information, and (iii) determining, based on the network traffic information, a current system context from among a plurality of system contexts. Each of the plurality of system contexts indicates a respective aggregate status of a plurality of devices in the communication network. The operations also include (iv) selecting, based on the current system context, a set of filtering rules from among a plurality of sets of filtering rules, (v) applying the selected set of filtering rules to the plurality of network messages to determine a subset of the plurality of network messages that are acceptable for the current system context, and (vi) forwarding each network message of the subset to a destination of the network message.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 3A illustrates a matrix of network traffic information, according to an example embodiment.

FIG. 3B illustrates a vector of network traffic information, according to another example embodiment.

DETAILED DESCRIPTION

Figure 1:
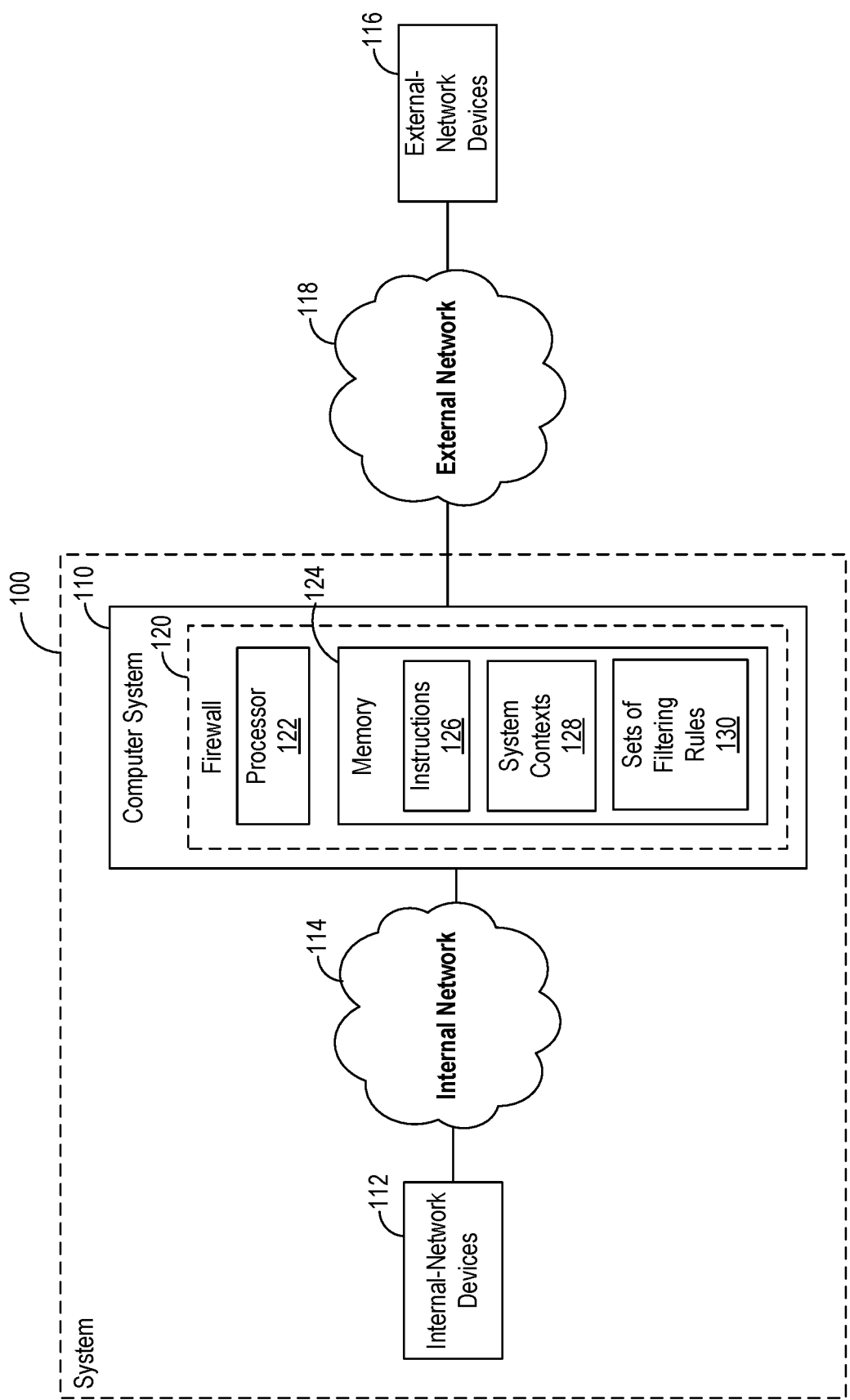
FIG. 1 illustrates a simplified block diagram of a system for filtering network messages, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

As noted above, a context-aware firewall system can filter network messages by applying a set of filtering rules selected from among a plurality of sets of filtering rules based on a current system context. To do so, the system determines the current system context from among a plurality of potential system contexts. Typically, context-aware firewall systems determine the current system context from among the potential system contexts based on sensor signal information. For instance, in an implementation in which the context-aware firewall system is deployed on an aircraft, the context-aware firewall system may determine the current system context based on sensor signal information relating to the airplane altitude, speed, and/or angle.

However, context-aware firewall systems that rely exclusively on sensor signal information require human experts and/or network designers to manually create a configuration file that defines how the context-aware firewall system identifies a change in the system context based on the sensor signal information. This manual process may be prone to human error, especially in implementations in which the system involves a relatively complex configuration file including a relatively large number of system contexts. Additionally, for example, sensor signal information may not be available in some implementations (e.g., for system security purposes).

Example systems and methods described herein can beneficially address at least some drawbacks of existing context-aware firewall systems. Within examples, a system can filter network messages in an internal network (e.g., an avionic network) based on a current system context, which the system can determine based on network traffic information. Specifically, the system can monitor network messages within the internal network and determine the network traffic based on, for example, the source network address, the destination network address, and/or the port number of each network message (e.g., a data packet of the network message). Within examples, the system can be programmed to determine, based on the network traffic information, the current system context using machine learning techniques. By automatically determining the current system context from the network traffic information, the system can determine the current system context and apply an appropriate set of filtering rules independent of sensor signal information. This can, among other things, reduce (or minimize) the risk of human error encountered when configuring existing systems, and/or provide for improved security of sensor signal information.

Implementations of this disclosure provide technological improvements that are particular to computer networks, for example, those concerning operation in aviation environments. Computer network-specific technological problems, such as reducing response time, reliance on external sensor signals, and complex filter programming susceptible to human error, can be wholly or partially solved by implementations of this disclosure. For example, implementation of this disclosure reduces the response time for switching between system contexts by monitoring network traffic information in real-time and inferring the current system context based on that real-time network traffic information. Implementations of this disclosure can thus introduce new and efficient improvements in the ways in which the current system context can be determined independent of external sensor signals, which may be unavailable due to, for instance, security considerations.

The systems and methods of the present disclosure address problems particular to computer networks, for example, those concerning programming context-aware firewalls. These computing network-specific issues can be solved by implementations of the present disclosure. For example, by inputting test network traffic information into a neural network and using machine learning techniques, the context-aware firewall can be efficiently and automatically programmed without the need to generate the complex configuration files required by existing context-aware firewalls. The implementations of the present disclosure thus introduce new and efficient improvements in the ways in which context-aware firewalls can be rapidly and efficiently configured to operate in different computing environments.

Implementations of this disclosure can thus introduce new and efficient improvements in the ways in which events are processed for computer networks, such as by using the network traffic information within a network to determine a current system context of the system from among a plurality of possible system contexts.

Referring now to FIG. 1, a simplified block diagram of a system 100 for filtering network messages is illustrated according to an example embodiment. As shown in FIG. 1, the system 100 includes a computer system 110, which can monitor and control transmissions of network messages (i) between a plurality of internal-network devices 112 in an internal network 114, and/or (ii) between the internal-network devices 112 in the internal network 114 and one or more external-network devices 116 over an external network 118. In this arrangement and as described in detail below, the computer system 110 can provide a firewall 120 (e.g., an internal-network firewall and/or a perimeter firewall) for filtering the network messages in the internal network 114 based on a current system context.

In general, the internal-network devices 112 can receive and/or transmit the network messages within the internal network 114 to facilitate performing various operations of the system 100. For example, in one implementation described below for FIG. 5A, the internal-network devices 112 in the internal network 114 can be avionic devices in an avionic network, which operate to carry out functions of an avionic system (e.g., an airplane, a spacecraft, a helicopter, and/or an unmanned aerial vehicle). For instance, the internal-network devices 112 can perform operations for flight control, navigation, and/or in-flight entertainment to operate the avionic system.

As another example, in an implementation described below for FIG. 5B, the internal-network devices 112 in the internal network 114 can be vehicular devices in an autonomous vehicle network, which operate to carry out functions of an autonomous vehicle system (e.g., a self-driving car). For instance, the internal-network devices 112 can perform operations for steering, acceleration, braking, navigation, and/or in-route entertainment to operate the autonomous vehicle. As additional examples, the internal-network devices 112 can perform operations to carry out functions of a manufacturing facility, a business office facility, and/or a smart home (e.g., a home equipped with one or more computer-controlled devices such as, for instance, lighting devices, heating devices, air-conditioning devices, and/or home appliances).

In some examples, the internal-network devices 112 can be at a common location. For instance, in an implementation in which the system 100 is a vehicle (e.g., an avionic system and/or an autonomous vehicle), the internal-network devices 112 can be on-board the vehicle and the external-network devices 116 can be at a different location, separate from the vehicle. In another implementation in which the system 100 is a business facility, the internal-network devices 112 can be housed in a common building structure and the external-network devices 116 can be housed in different building structures and/or at remote locations. In other examples, at least one of the internal-network devices 112 can be at a different location than another one of the internal-network devices 112.

The internal network 114 is a communication network for communicating the network messages to the internal-network devices 112 and/or from the internal-network devices 112. As such, the internal network 114 can include one or more wired and/or wireless connections such as, for example, one or more intranets, Ethernet connections, local area networks (LANs), wide area networks (WANs), near-field communication networks, Bluetooth® radio technology connections, ZigBee® technology connections, and/or proprietary technology connections. Within examples, the internal network 114 can include one or more gateways, network switches, and/or routers for transmitting and receiving the network messages within the internal network 114.

Additionally, within examples, one or more of the internal-network devices 112 of the system 100 can communicate with the external-network devices 116 to facilitate the internal-network devices 112 performing the operations for the system 100. In general, the external-network device(s) 116 are any device that is not in the internal network 114 (i.e., any device that is outside of the internal network 114). The types of external-network devices 116 with which the internal-network devices 112 communicate may be based on the type of system 100. As examples, the external-network devices 116 can include e-commerce merchants, equipment suppliers, service providers, servicers (e.g., for maintenance), traffic control centers, regulatory agencies, and/or other like systems (e.g., other vehicles in the air and/or on a road).

The external network 118 can include one or more wired and/or wireless connections such as, for example, the Internet, an intranet, a LAN network, a WAN network, a public switched telephone network (PSTN network), a satellite network, communication protocols described in IEEE 802.11 (including any IEEE 802.11 revisions), proprietary connections, and/or cellular technology (such as GSM, CDMA, UMTS, EV-DO, WiMAX, or LTE). The external network 118 can also include one or more gateways, network switches, and/or routers.

In one example, the internal network 114 can be a private network, whereas the external network 118 can be a public network. In another example, the internal network 114 can be a trusted network, whereas the external network 118 can be an untrusted network and/or an unknown network. In another example, the internal-network devices 112 can be trusted devices, whereas one or more of the external-network devices 116 can be untrusted devices.

As noted above, the computer system 110 is operable to provide a firewall 120 for filtering the network messages within the internal network 114 (i.e., the network messages transmitted between the internal-network devices 112 and/or the network messages transmitted between the internal-network devices 112 and the external-network devices 116). As shown in FIG. 1, the firewall 120 can be implemented using hardware, software, and/or firmware. For example, the firewall 120 of the computer system 110 can include one or more processors 122 and a non-transitory computer readable medium (e.g., volatile and/or non-volatile memory 124) that stores instructions 126 (e.g., machine language instructions or other executable instructions). The instructions 126, when executed by the one or more processors 122, cause the computer system 110 to carry out the various operations described herein.

Also, as shown in FIG. 1, the memory 124 can store a plurality of system contexts 128 and a plurality of sets of filtering rules 130. In general, each system context 128 can represent a respective aggregate status of the plurality of internal-network devices 112 in the internal network 114 (e.g., a date, a time, a location, and/or a state of the internal-network devices 112). As an example, in an implementation in which the internal-network devices 112 are avionic devices, the system contexts 128 can be based on a date, a time, a location of the avionic devices, and/or a flight phase. For instance, in one implementation, the system contexts 128 can include a power on context, a pre-flight context, an engine start context, an in-gate context, a taxi-out context, a takeoff context, a climb context, a cruise context, a descent context, an approach context, a rollout context, a taxi-in context, a go around context, an engine shutdown context, and/or a maintenance context for the avionic devices in an aviation network (e.g., on an aircraft, a spacecraft, a helicopter, and/or an unmanned aerial vehicle). As one example, in the maintenance context, the aggregate status of the plurality of internal-network devices 112 can include (i) one or more line replaceable units (LRUs) in a powered-on state configured to transmit shop fault data and/or receive new operational data and/or configuration data, (ii) while a global positioning system (GPS) and a passenger device are in a powered-down state. In another example, in a cruise context, the aggregate status of the internal-network devices 112 can include (i) the internal-network devices 112 being located at a particular altitude and a particular location along a flight route while (ii) the passenger devices are in a powered-on state for providing entertainment services to passengers and the LRUs are in a powered-on state configured to receive Pilot Reports (PIREP) from other aircraft and/or weather reports.

In another example, in which the internal-network devices 112 are vehicular devices, the system contexts 128 can include a power-on context, a parked context, a reverse context, a stopped-drive context, a moving-drive context, a low-speed context, a high-speed context, a power-down context, an at-source-location context, an in-route context, and/or an at-destination-location context. In another example in which the internal-network devices 112 are a part of a business office facility, the system contexts 128 can include a regular business hours context, an extended business hours context, and/or a closed for business context.

Each system context 128 is associated with a respective one of the sets of filtering rules 130. Each set of filtering rules 130 can define which of the network messages are allowed to be transmitted in the internal network 114 and which of the network messages are blocked in the internal network 114 when the internal-network devices 112 are in the system context 128 associated with that set of filtering rules 130. Within examples, the sets of filtering rules 130 can each include rules applying one or more packet filters, network layer filters, application layer filters, stateless filters, and/or stateful filters to allow and/or block the network messages within the internal network 114. For instance, in one implementation, the processor 122 can apply one of the sets of filtering rules 130 to filter each network message based on a source address, a destination address, a protocol, a source port number, and/or a destination port number for the network message.

By applying a different set of filtering rules 130 based on the current system context 128 of the internal-network devices 112, the computer system 110 can beneficially allow and/or block different network traffic in different situations. This can result in efficient use of network resources and/or restrict network traffic to indirectly control the operation of one or more of the internal-network devices 112 (e.g., certain functions and/or uses of a given internal-network device 112 may be limited by blocking certain types of network messages for the internal-network device 112).

As one example, in an implementation in which the computer system 110 provides the firewall 120 in an aircraft, the computer system 110 can allow network traffic associated with entertainment (e.g., video and/or audio streaming) when the computer system 110 determines that the current system context 128 is the cruise context, and block the network traffic associated with entertainment when the computer system 110 determines that the current system context 128 is the taxi-out context. This can help to reduce distractions to passengers of the aircraft during presentation of safety information while the aircraft is taxing out for a flight.

As noted above, the system 100 can determine the current system context 128 based on network traffic information derived from the network messages transmitted to and from the internal-network devices 112. For example, the processor 122 of the computer system 110 can receive a plurality of network messages transmitted within the internal network 114. As noted above, the network messages transmitted within the internal network 114 can be transmitted between the internal-network devices 112 (e.g., among avionic devices) and/or between at least one of the internal-network devices 112 and at least one external-network device 116.

After receiving the network messages, the processor 122 can analyze the network messages to determine network traffic information. The network traffic information can relate to raw network traffic data based on, for example, a source address, a destination address, a network port, a type of service, and/or a payload in packets of the network messages.

Figure 2:
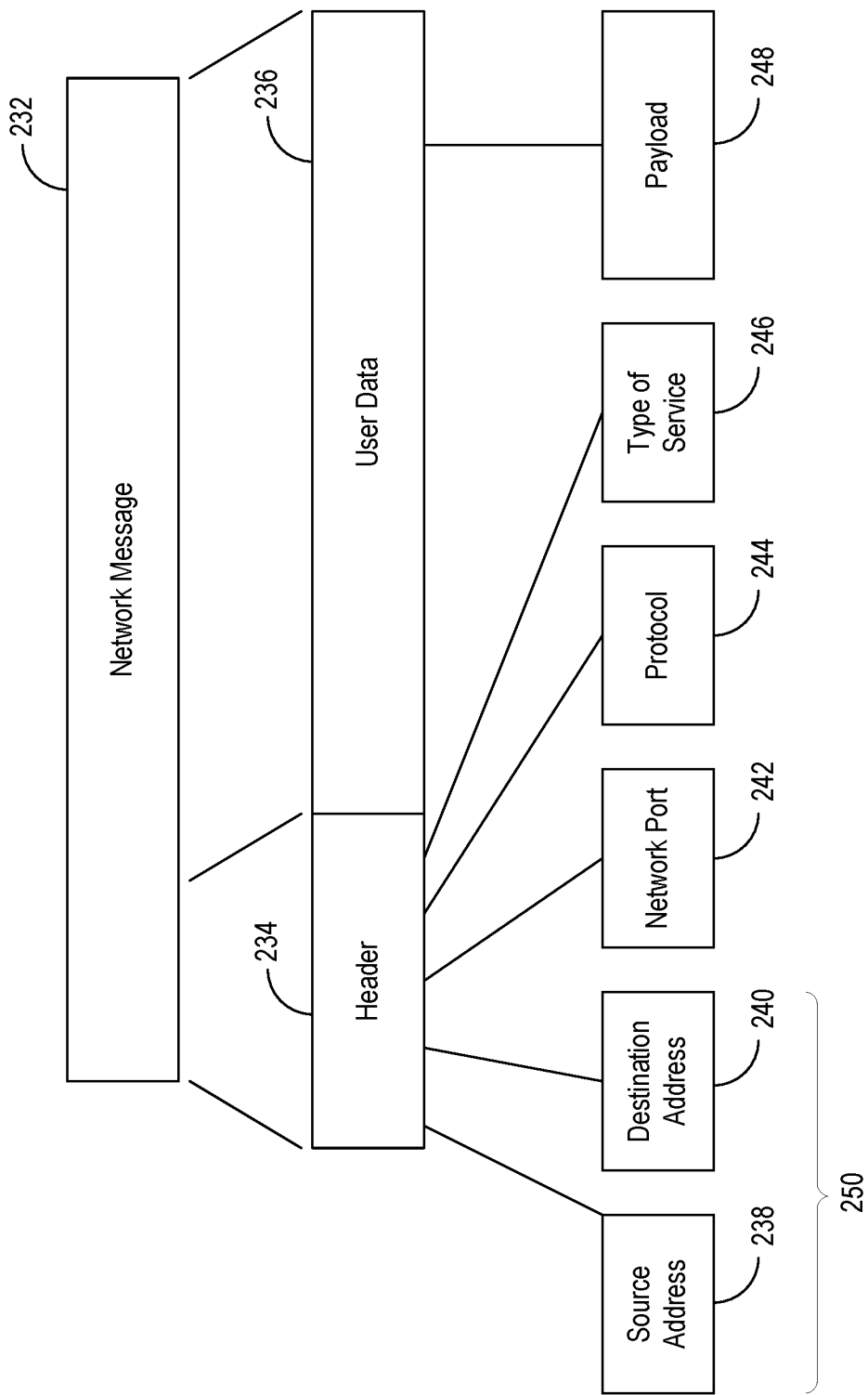
FIG. 2 illustrates a simplified block diagram of a network message, according to an example embodiment.

For example, FIG. 2 depicts a block diagram of a network message 232 according to an example embodiment. As shown in FIG. 2, the network message 232 includes a header 234 and user data 236. The header 234 can include a source address 238, a destination address 240, a network port 242, a protocol 244, and/or a type of service 246. The user data 236 can be a payload 248 for the network message 232. As examples, the network messages 232 can be in an Transmission Control Protocol/Internet Protocol (TCP/IP) packet, a User Datagram Protocol (UDP) packet, Internet Control Message Protocol (ICMP), and/or Internet Protocol Security (IPsec).

In an example, the processor 122 can analyze the network messages 232 by extracting, from the header 234 of each network message 232, a pair of addresses 250 including the source address 238 and the destination address 240 for the network message 232. The processor 122 can then determine, for the network messages 232, an amount of network traffic between each pair of addresses 250 over a period of time.

For example, FIG. 3A depicts a matrix of network traffic information 352A determined by the processor 122 over a period of time according to an example embodiment. In FIG. 3A, each row of the matrix represents the source address 238 and each column of the matrix represents the destination address 240. Thus, in this example, each cell of the matrix corresponds to a respective pair of addresses 250. As shown in FIG. 3A, each cell of the matrix indicates an amount of network traffic 354A (e.g., the amount of the user data 236 in units of bytes, megabytes, gigabytes, terabytes, etc.) over a given period of time for transmission from the respective source address 238 to the destination address 240 represented by the cell.

In another example, one or more of the cells in the matrix can represent a range of source addresses 238 and/or a range of destination addresses 240 instead of a pair of addresses 250, as described above. This example may be beneficial in implementations in which the system 100 includes a relatively large quantity of internal-network devices 112.

In another example, the processor 122 can additionally or alternatively analyze the network messages 232 by extracting, from the header 234 of each network message 232, a network port 242 for the network message 232. The processor 122 can then determine, for each network port 242, a percentage of the network traffic over the period of time.

For example, FIG. 3B depicts a vector of network traffic information 352B determined by the processor 122 over the period of time according to an example embodiment. In FIG. 3B, each cell represents a percentage of the network traffic 354B for a respective one of the network ports 242. Although the vector includes 1024 network ports 242, the vector can include lesser or greater quantity of network ports 242 in other examples.

In one example, the period of time can be one minute. In other examples, the period of time can be a period of time (i) between approximately one second and approximately one minute, (ii) between approximately one minute and approximately five minutes, (iii) between approximately five minutes and approximately 10 minutes, and/or (iv) between approximately 10 minutes and approximately one hour. In some instances, it may be beneficial to determine the network traffic information 352A, 352B over a relatively short period of time (e.g., one minute) to facilitate the computer system 110 identifying a change in the current system context 128 relatively rapidly.

In some examples, the processor 122 can continuously determine the network traffic information during operation of the system 100. In other examples, the processor 122 can periodically determine the network traffic information during operation of the system 100.

After the processor 122 determines the network traffic information 352A, 352B, the processor 122 can then use the network traffic information 352A, 352B to determine the current system context 128 from among the plurality of system contexts 128 stored in the memory 124. For example, the processor 122 can then determine the current system context 128 based on the amount of network traffic 354A between each pair of addresses 250 over the period of time and/or based on the percentage of the network traffic 354B for each network port 242 over the period of time.

In one example, the processor 122 can determine the current system context 128 by (i) determining, based on the network traffic information (e.g., the network traffic information 352A, 352B), a confidence metric for each of the plurality of system contexts 128, (ii) performing a comparison of each confidence metric to a threshold value, and (iii) determining, based on the comparison, that the confidence metric for the current system context 128 is greater than the threshold value. In general, the confidence metric determined for each system context 128 can indicate a probability that the system context 128 is the current system context 128. For instance, for each system context 128, the processor 122 can determine the confidence metric as a percentage value between 0% and 100% (i.e., a value between 0.00 and 1.00) to indicate the probability that the system context 128 is the current system context 128.

In one implementation, the threshold value can be approximately 50% (i.e., a threshold value of approximately 0.50). In another example, the threshold value can be a value between approximately 30% and 99% (i.e., approximately 0.30 to 0.99). In some implementations in which the memory stores 124 a relatively large quantity of system contexts 128, the threshold value can be a value that is less than approximately 50%.

Figure 4:
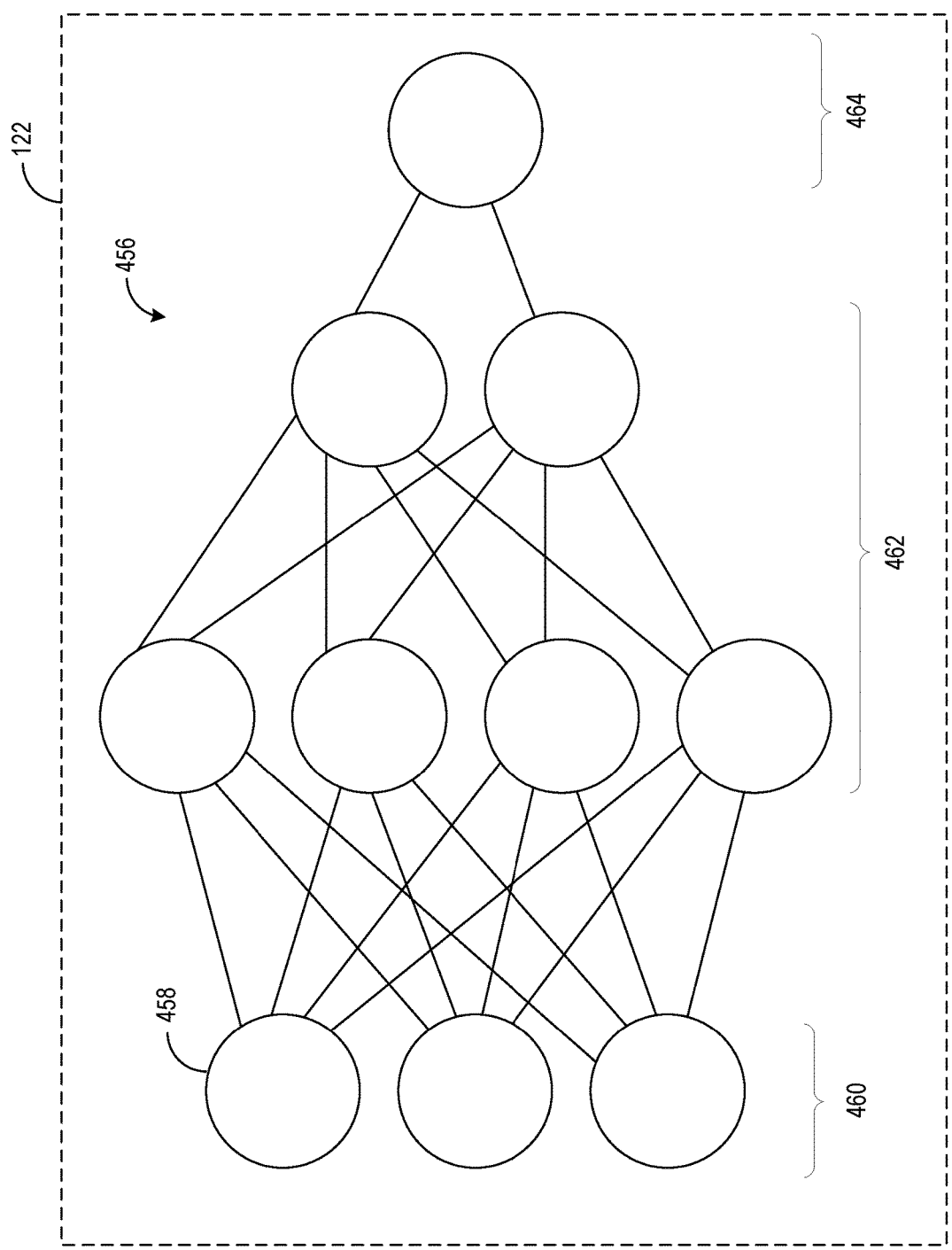
FIG. 4 illustrates a simplified block diagram of a neural network, according to an example embodiment.

In an example, the processor 122 is configured to execute the instructions 126 to operate as a neural network (e.g., to compute, based on the network traffic information, the confidence metrics for the system contexts 128). For instance, FIG. 4 depicts a simplified block diagram of a neural network 456 implemented by the processor 122 according to an example embodiment. As shown in FIG. 4, the neural network 456 can include a plurality of nodes 458 (i.e., a plurality of neurons) that are interconnected with each other and configured to compute relatively complex mathematical functions. In FIG. 4, the nodes 458 include an input layer 460, one or more hidden layers 462, and an output layer 464. In an example, the input layer 460 can receive the network traffic information (e.g., the network traffic information 352A, 352B) at the input layer 460, and output the confidence metrics at the output layer 464.

In FIG. 4, the input layer 460 includes three nodes 458, two hidden layers 462 include a total of six nodes 458, and the output layer 464 includes a single node 458. In other examples, the neural network 456 can have a different quantity of nodes 458 and/or a different quantity of hidden layers 462 than those shown in FIG. 4. Within examples, the quantity of nodes 458 and/or hidden layers 462 can be based, at least in part, on a size of the internal network 114 and/or the types of internal-network devices 112 in the internal network 114.

After determining the current system context 128, the processor 122 can select, based on the current system context 128, a set of filtering rules from among a plurality of sets of filtering rules 130. In one example, the memory 124 can store a table that maps the system contexts 128 to the sets of filtering rules 130. The computer system 110 can refer to that table to determine the set of filtering rules 130 corresponding to the determined current system context 128.

The computer system 110 can then apply the selected set of filtering rules 130 to the network messages 232 to allow and/or block the transmission of the network messages 232 in the internal network 114. For instance, the processor 122 can apply the selected set of filtering rules 130 to the plurality of network messages 232 to determine a subset of the plurality of network messages 232 that are acceptable for the current system context 128. The processor 122 can then forward each network message 232 of the subset to the destination of the network message 232 (e.g., the destination address 240).

As noted above, in some implementations, the processor 122 can determine the current system context 128 based on the confidence metric being greater than the threshold value. In some instances, all of the confidence metrics determined by the processor 122 may be below the threshold value, or more than one confidence metric may be above the threshold value. In such instances, the outcome of the system context determination by the processor 122 may be inclusive. This may occur, for example, due to noise in the internal network 114.

Within examples, when the outcome of the system context analysis is inconclusive, the processor 122 can (i) determine a subgroup of the system contexts 128 that are likely to be the current system context (e.g., based on the confidence metrics), (ii) determine one or more common filtering rules between the sets of filtering rules 130 for the subgroup of system contexts 128, (iii) applying the one or more common filtering rules 130 to the network messages 232 to determine a portion of the subset of network messages 232 that are acceptable for the subgroup of system contexts 128, (iv) forward each network message 232 of the portion of the subset to the destination of the network message 232, and (v) buffer, in the memory 124, a remainder of the network messages 232 until the processor 122 can conclusively determine the current system context 128. In this way, the computer system 110 can allow the network messages 232 that are certain to be allowable when the processor 122 conclusively determines the current system context 128, and hold the network messages 232 that may be blocked when the processor 122 conclusively determines the current system context 128. This can help to mitigate transmission delays for the network messages 232 likely to be allowable, while taking a conservative approach to the network messages 232 that may be blocked.

In examples in which the processor 122 is configured to execute the instructions 126 to operate as the neural network 456, the neural network 456 can be trained to determine the confidence metric for each system context 128 based on the network traffic information. Within examples, the neural network 456 can be trained by machine learning techniques that involve providing a plurality of test matrices for the network traffic information 352A and/or a plurality of test vectors for the network traffic information 352B along with an identification of the system context 128 that corresponds to each test matrix and/or test vector. In one implementation, the test matrices and/or the test vectors can be generated by (i) recording the network traffic information (e.g., via deep packet inspection) transmitted within the internal network 114 along with timestamp information during one or more operational cycles of the system 100, (ii) recording timestamp information for durations of the system contexts 128 during the operational cycle(s) (e.g., via a clock of the computer system 110), and (iii) correlating the network traffic information with the system contexts 128 based on the timestamp information.

Figure 5A:
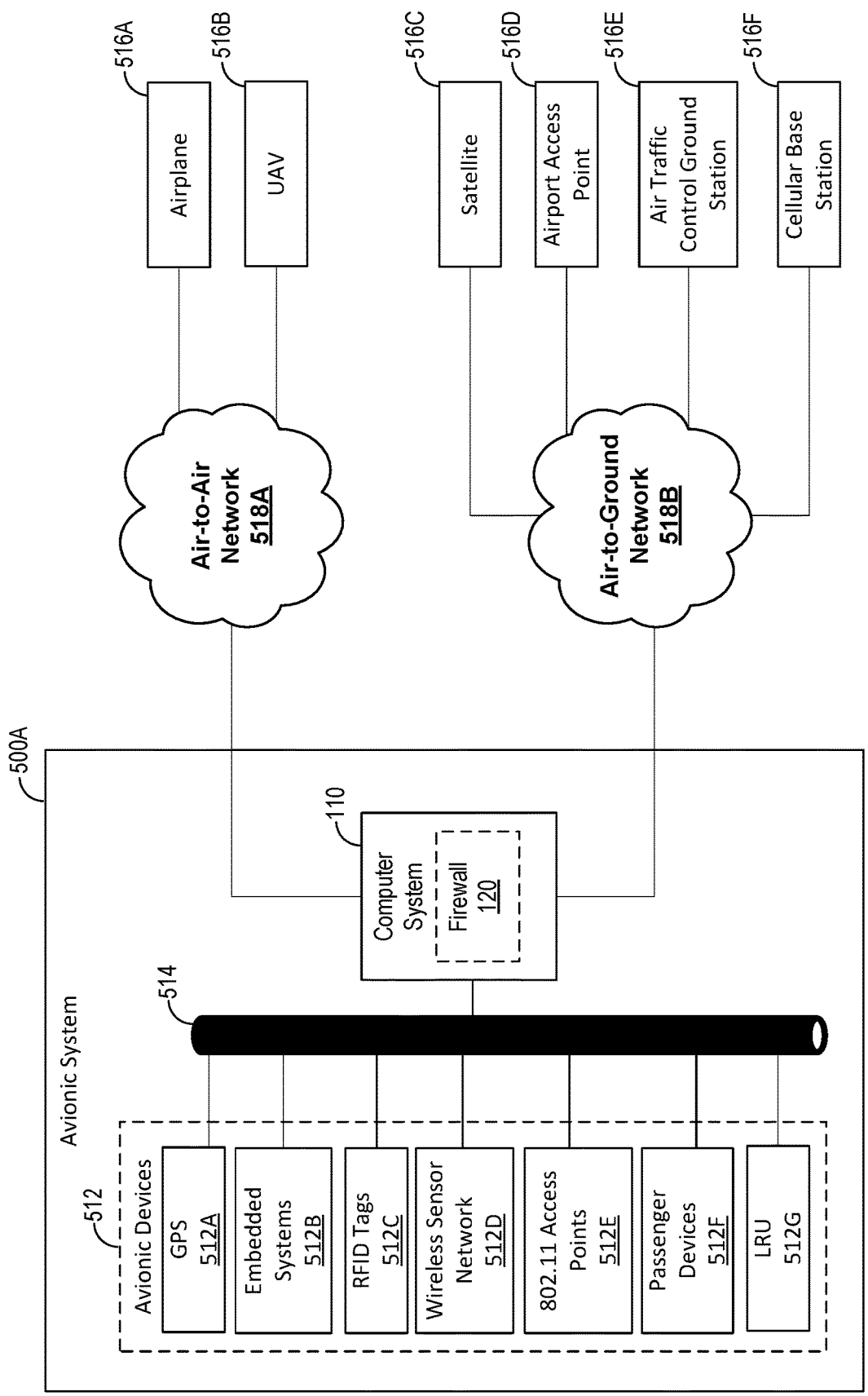
FIG. 5A illustrates a simplified block diagram of an avionic system, according to an example embodiment.

Referring now to FIG. 5A, a simplified block diagram of an avionic system 500A is illustrated according to another example embodiment. Specifically, in FIG. 5A, the avionic system 500A includes a plurality of avionic devices 512 in an avionic network 514. As such, the avionic devices 512 in the avionic network 514 can be the internal-network devices 112 in the internal network 114 described above and illustrated in FIG. 1.

As shown in FIG. 5A, the avionic devices 512 can include one or more global position systems (GPS) 512A, embedded systems 512B, radio frequency identification (RFID) tags 512C, wireless sensor networks 512D, 802.11 access points 512E, and/or passenger devices 512F (e.g., in-flight entertainment systems, mobile phones, tablet computers, and/or laptop computers). Additionally, for example, the avionic devices 512 can include one or more line replaceable units (LRUs) 512G. An LRU 512G can include a modular component of an airplane, ship, or spacecraft (or any other manufactured avionic device) that is designed to be replaced quickly at an operating location. An LRU 512G can be a sealed unit such as a radio or other auxiliary equipment. In some implementations, the LRU(s) 512G can include a Flight Management Computer (FMC), an On Board Network System (ONS), and/or a Central Maintenance computer (CMC).

In some implementations, the avionic devices 512 can be in communication with one or more entities outside of the avionic system 500A such as, for instance, e-commerce merchants, airplane manufacturers, onboard equipment suppliers, airlines, aeronautical and other network service providers, servicers (for maintenance), air traffic control (ATC) centers, regulatory agencies (e.g., the Federal Aviation Administration), and other airplanes, such as an airplane 516A and an unmanned aerial vehicle 516B. This can, for example, facilitate the avionic devices 512 receiving and transmitting the network messages 232 carrying information corresponding to, among other things, loadable software (e.g., navigation databases, electronic flight bag, weather reports), health data (e.g., wireless sensor and tag data, diagnostics), and/or traffic control data (e.g., traffic beacons).

As shown in FIG. 5A, the avionic devices 512 in the avionic network 514 are connected to the entities outside the avionic system 500A by an air-to-air (A2A) network 518A and/or an air-to-ground (A2G) network 518B. Within examples, the avionic devices 512 can transmit the network messages 232 to and/or receive the network messages 232 from the airplane 516A and/or the unmanned aerial vehicle 516B via the A2A network 518A. Similarly, the avionic devices 512 can transmit the network messages 232 to and/or receive the network messages 232 from airline infrastructure entities by communicating with a satellite 516C, an airport access point 516D, an air traffic control (ATC) ground station 516E, and/or cellular base station 516F, via A2G network 518B.

Additionally, as shown in FIG. 5A, the avionic system 500A includes the computer system 110, which can monitor and control transmissions of the network messages 232 (i) between the avionic devices 512 in the avionic network 514, and/or (ii) between the avionic devices 512 in the avionic network 514 and the entities outside the avionic network 514 described above. In this arrangement and as described in detail above, the computer system 110 can provide the firewall 120 for filtering the network messages in the avionic network 514 based on the current system context 128.

Figure 5B:
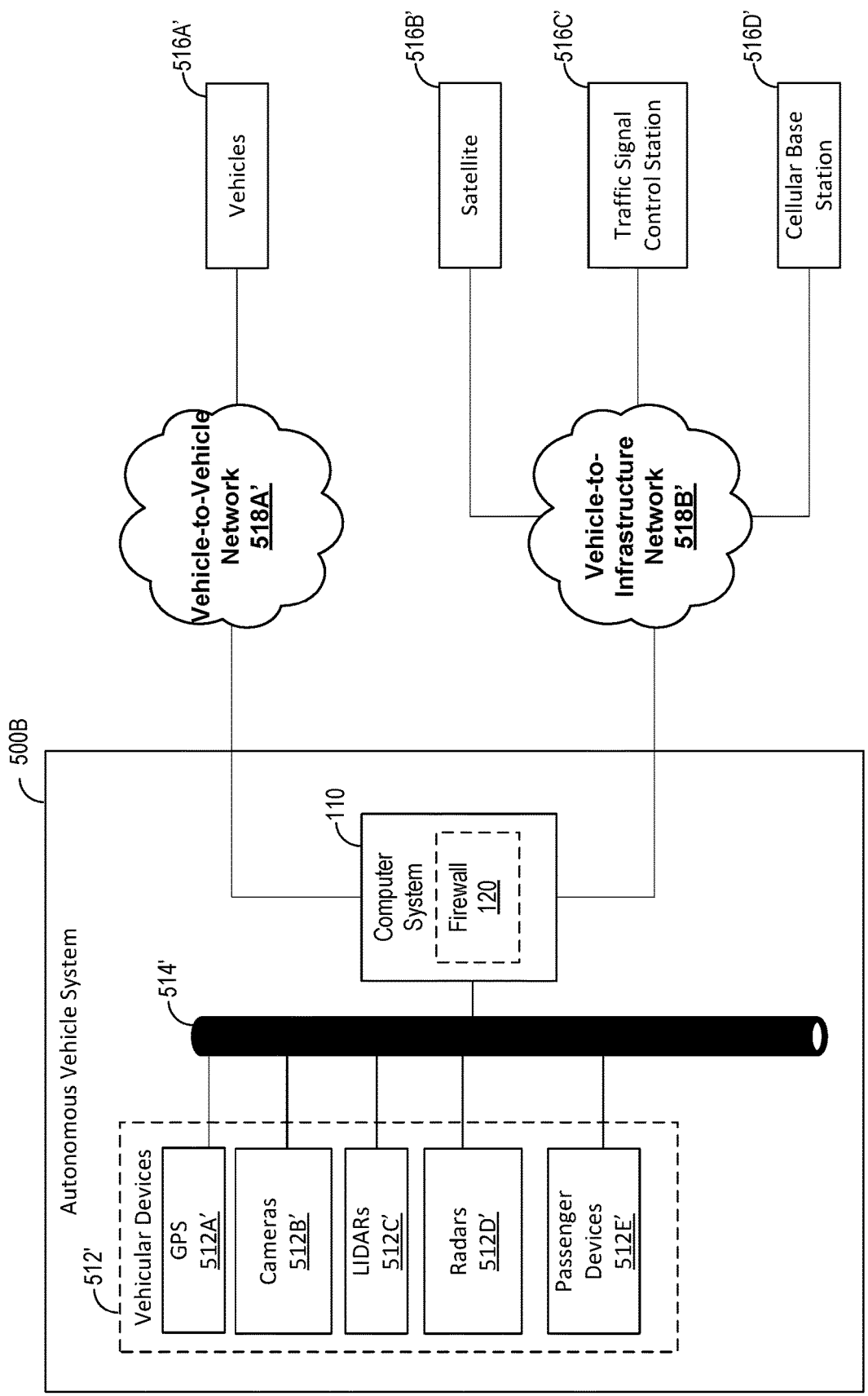
FIG. 5B illustrates a simplified block diagram of an autonomous vehicle system, according to an example embodiment.

Referring now to FIG. 5B, a simplified block diagram of an autonomous vehicle system 500B is illustrated according to another example embodiment. Specifically, in FIG. 5A, the autonomous vehicle system 500B includes a plurality of vehicular devices 512' in an autonomous vehicle network 514'. As such, the vehicular devices 512' in the autonomous vehicle network 514' can be the internal-network devices 112 in the internal network 114 described above and illustrated in FIG. 1.

As shown in FIG. 5B, the vehicular devices 512' can include one or more GPS systems 512A', cameras 512B', LIDAR systems 512C', and/or radar systems 512D' that can provide data for autonomous vehicle navigation and control. Additionally, the vehicular devices 512' can include one or more passenger devices 512E' to, for example, provide a user interface for operating the autonomous vehicle system 500B.

Also, as shown in FIG. 5B, the vehicular devices 512' can transmit and receive network messages 232 to facilitate communication with other vehicles 516A' via a vehicle-to-vehicle network 518A'. Similarly, the vehicular devices 512' can transmit and receive network messages 232 to facilitate communication with other a satellite 516B', a traffic signal control station 516C' (e.g., indicating the state of traffic control signals on roadways), and/or a cellular base station 516D' via a vehicle-to-infrastructure network 516B' (e.g., in a manner similar to that described above for FIG. 5A).

As shown in FIG. 5B, the autonomous vehicle system 500B includes the computer system 110, which can monitor and control transmissions of the network messages 232 (i) between the vehicular devices 512' in the autonomous vehicle network 514', and/or (ii) between the vehicular devices 512' in the autonomous vehicle network 514' and the entities outside the autonomous vehicle network 514'. In this arrangement and as described in detail above, the computer system 110 can provide the firewall 120 for filtering the network messages in the autonomous vehicle network 514' based on the current system context 514.

Figure 6:
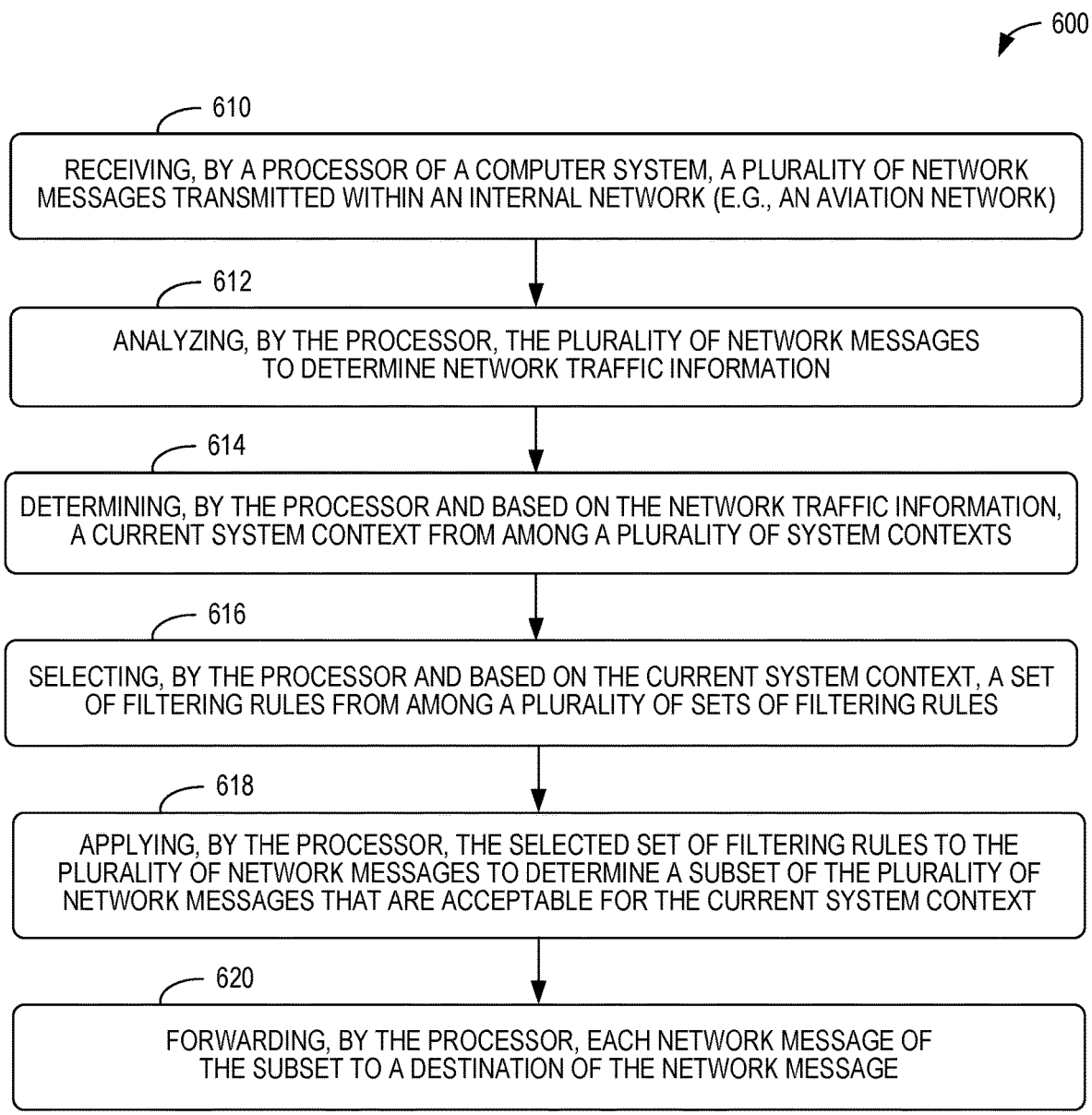
FIG. 6 illustrates a flow chart of an example process for operating an aerial vehicle, according to an example embodiment.

Referring now to FIG. 6, a flowchart for a process 600 for filtering network messages in an aviation network based on a current system context is illustrated according to an example embodiment. As shown in FIG. 6, at block 610, the process 600 includes receiving, by a processor of a computer system, a plurality of network messages transmitted within an internal network (e.g., an aviation network). At block 612, the process 600 includes analyzing, by the processor, the plurality of network messages to determine network traffic information. At block 614, the process 600 includes determining, by the processor and based on the network traffic information determined at block 612, a current system context from among a plurality of system contexts. Each of the plurality of system contexts indicates a respective aggregate status of a plurality of internal-network devices in the internal network (e.g., indicates a respective aggregate status of a plurality of avionic devices in the aviation network).

At block 616, the process 600 includes selecting, by the processor and based on the current system context, a set of filtering rules from among a plurality of sets of filtering rules. At block 618, the process 600 includes applying, by the processor, the selected set of filtering rules to the plurality of network messages to determine a subset of the plurality of network messages that are acceptable for the current system context. At block 620, the process 600 includes forwarding, by the processor, each network message of the subset to a destination of the network message.

Figure 7:
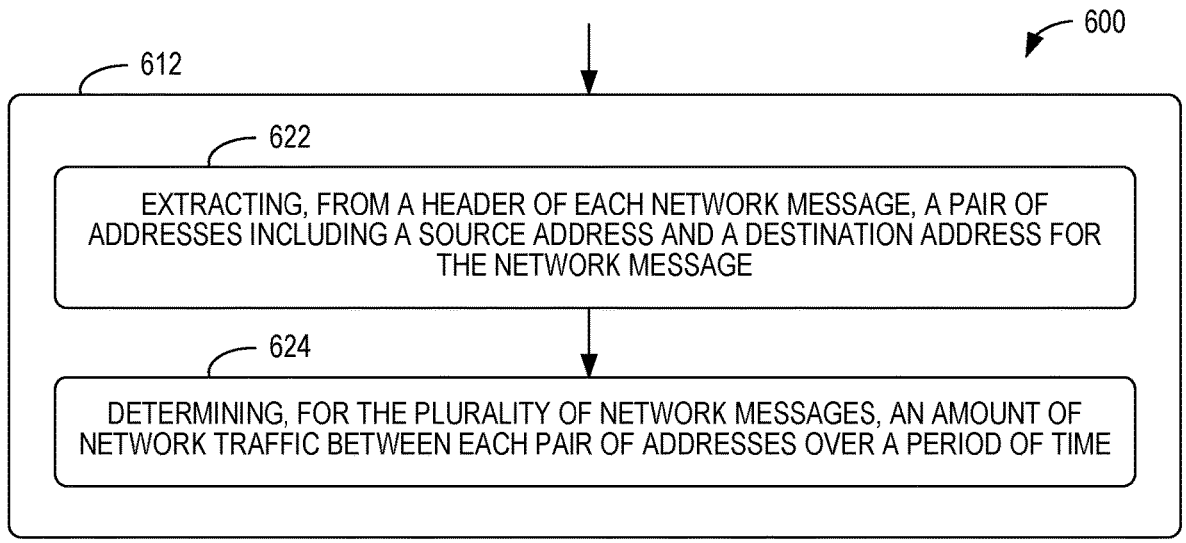
FIG. 7 illustrates a flow chart of an example process for operating an aerial vehicle that can be used with the process shown in FIG. 6.

FIGS. 7-15 depict additional aspects of the process 600 according to further examples. As shown in FIG. 7, to analyze the plurality of network messages to determine the network traffic information at block 612, the process 600 can include extracting, from a header of each network message, a pair of addresses including a source address and a destination address for the network message at block 622, and determining, for the plurality of network messages, an amount of network traffic between each pair of addresses over a period of time at block 624.

Figure 8:
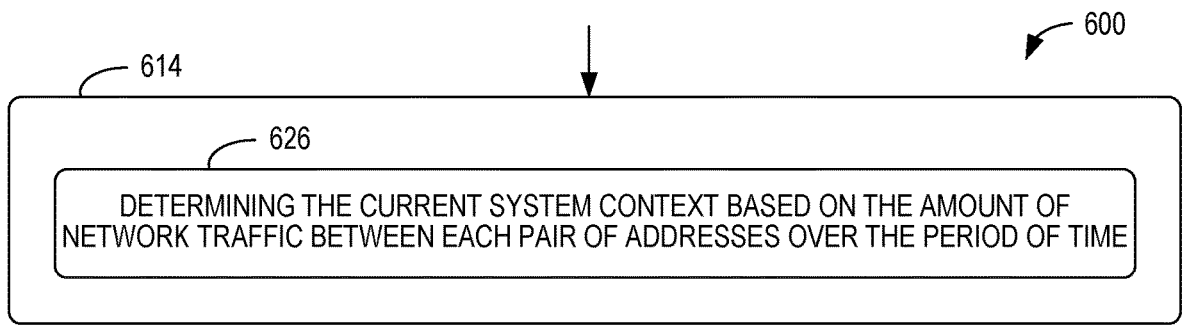
FIG. 8 illustrates a flow chart of an example process for operating an aerial vehicle that can be used with the process shown in FIG. 7.

As shown in FIG. 8, to determine, based on the network traffic information, the current system context at block 614, the process 600 can include determining the current system context based on the amount of network traffic between each pair of addresses over the period of time at block 626.

Figure 9:
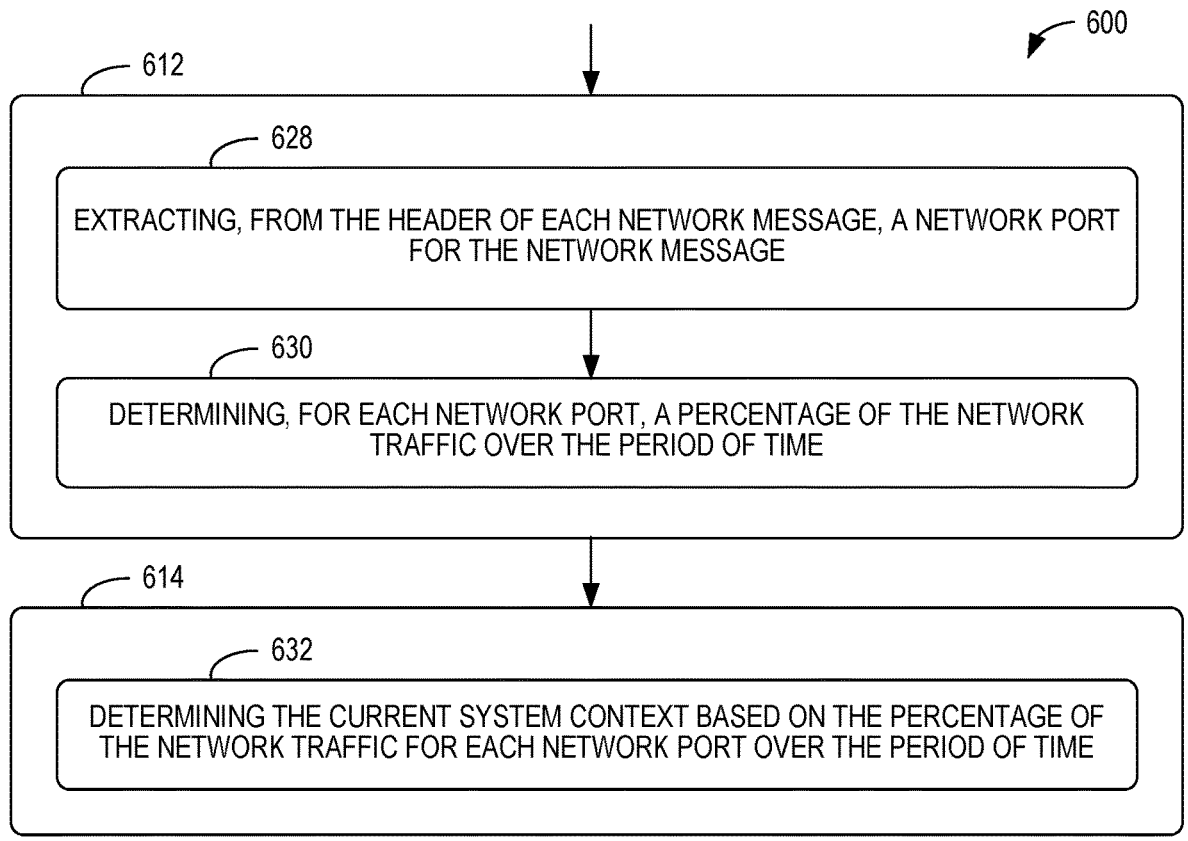
FIG. 9 illustrates a flow chart of an example process for operating an aerial vehicle that can be used with the process shown in FIG. 8.

As shown in FIG. 9, to analyze the plurality of network messages to determine the network traffic information at block 612, the process 600 can include (i) extracting, from the header of each network message, a network port for the network message at block 628 and (ii) determining, for each network port, a percentage of the network traffic over the period of time at block 630. As also shown in FIG. 9, to determine, based on the network traffic information, the current system context at block 614, the process 600 can include determining the current system context based on the percentage of the network traffic for each network port over the period of time at block 632.

Figure 10:
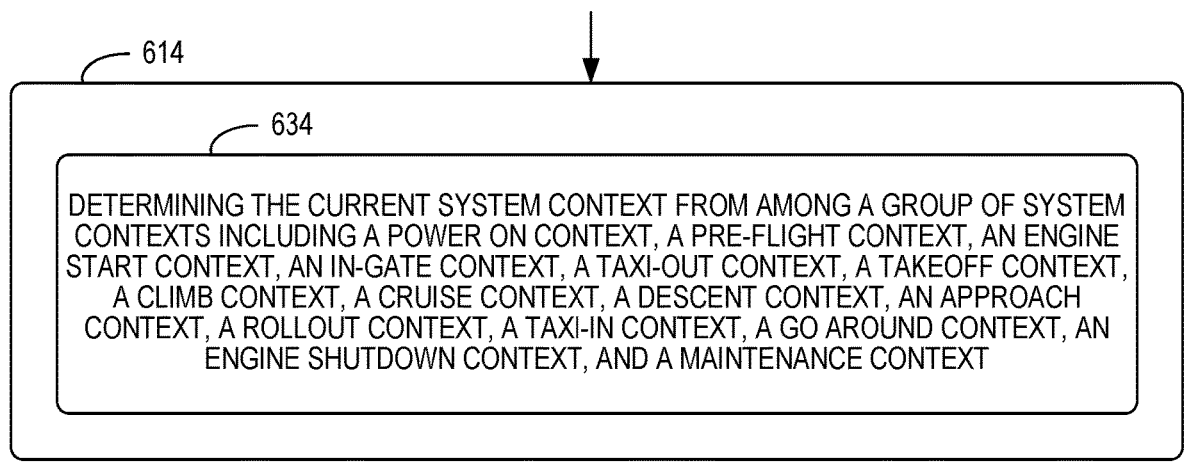
FIG. 10 illustrates a flow chart of an example process for operating an aerial vehicle that can be used with the process shown in FIG. 6.

In FIG. 10, the plurality of avionic devices include a GPS system, a plurality of passenger devices, and a LRU on-board an aircraft. As shown in FIG. 10, to determine, by the processor and based on the network traffic information, the current system context from among the plurality of system contexts at block 614, the process 600 can include determining the current system context from among a group of system contexts including a power on context, a pre-flight context, an engine start context, an in-gate context, a taxi-out context, a takeoff context, a climb context, a cruise context, a descent context, an approach context, a rollout context, a taxi-in context, a go around context, an engine shutdown context, and a maintenance context at block 634.

Figure 11:
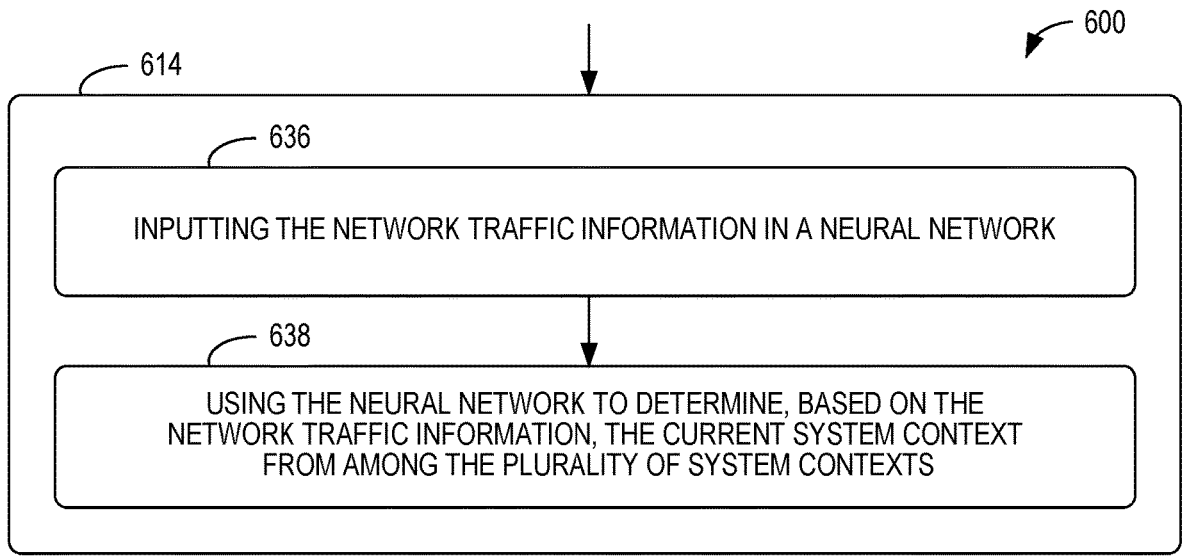
FIG. 11 illustrates a flow chart of an example process for operating an aerial vehicle that can be used with the process shown in FIG. 6.

As shown in FIG. 11, to determine, based on the network traffic information, the current system context from among the plurality of system contexts at block 614, the process 600 can include: (i) inputting the network traffic information in a neural network at block 636, and (ii) using the neural network to determine, based on the network traffic information, the current system context from among the plurality of system contexts at block 638.

Figure 12:
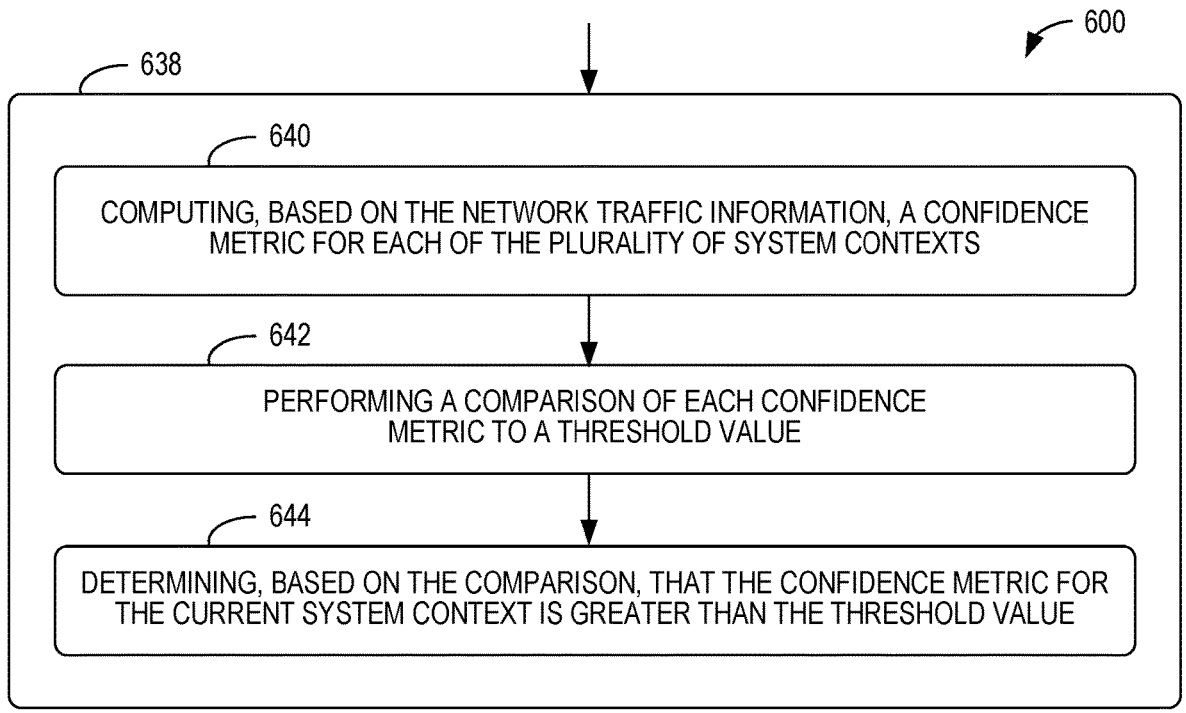
FIG. 12 illustrates a flow chart of an example process for operating an aerial vehicle that can be used with the process shown in FIG. 11.

As shown in FIG. 12, to determine, based on the network traffic information, the current system context from among the plurality of system contexts at block 638, the process 600 can include: (i) computing, based on the network traffic information, a confidence metric for each of the plurality of system contexts at block 640, (ii) performing a comparison of each confidence metric to a threshold value at block 642, and (iii) determining, based on the comparison, that the confidence metric for the current system context is greater than the threshold value at block 644.

Figure 13:
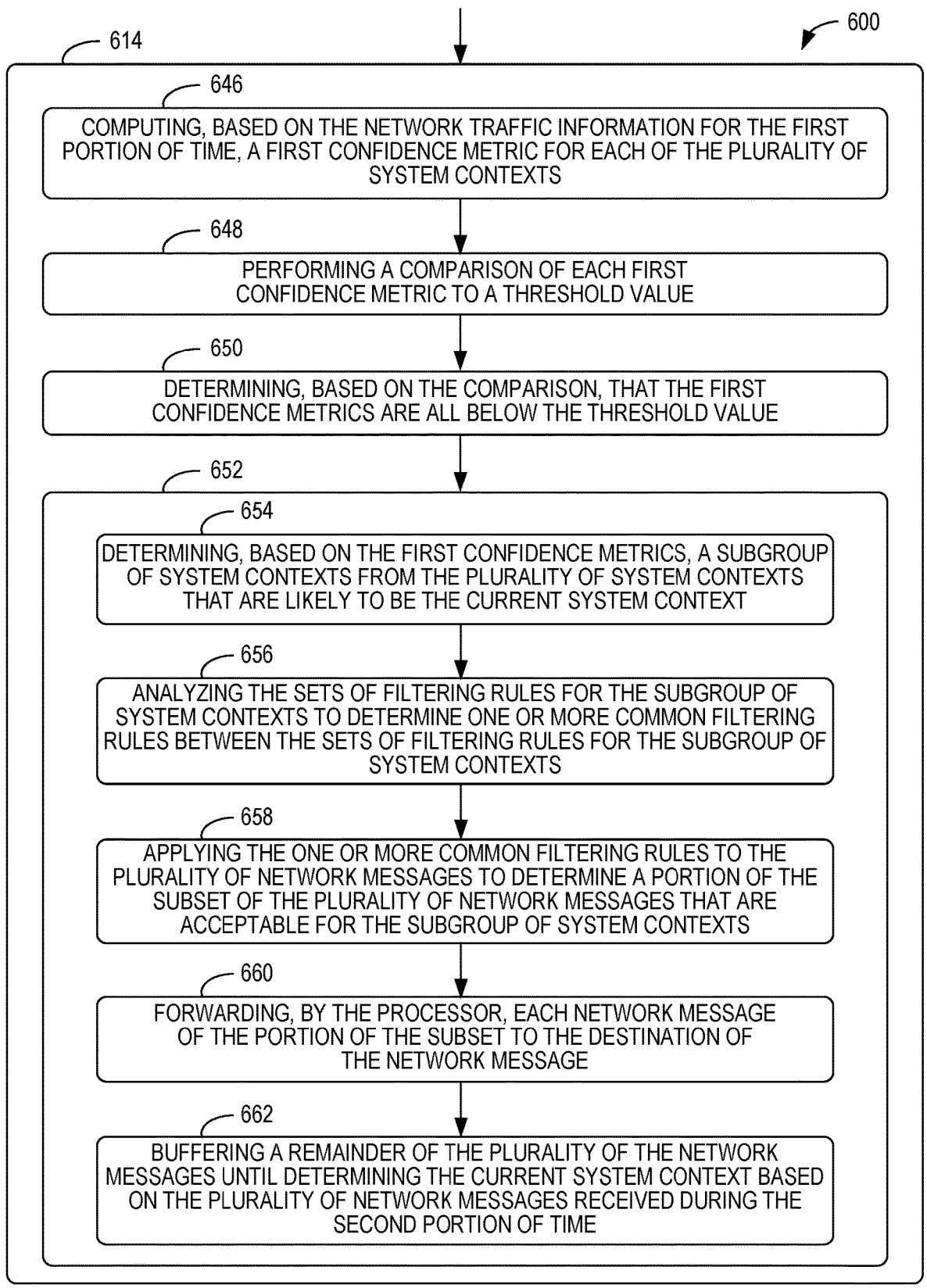
FIG. 13 illustrates a flow chart of an example process for operating an aerial vehicle that can be used with the process shown in FIG. 6.

In the process 600 shown in FIG. 13, the plurality of network messages are received over a period of time including a first portion of time and a second portion of time. As shown in FIG. 13, determining the current system context at block 614 can include: (i) computing, based on the network traffic information for the first portion of time, a first confidence metric for each of the plurality of system contexts at block 646, (ii) performing a comparison of each first confidence metric to a threshold value at block 648, (iii) determining, based on the comparison at block 648, that the first confidence metrics are all below the threshold value at block 650, and (iv) responsive to determining that the first confidence metrics are all below the threshold value at block 650, performing a series of operations at block 652.

As shown in FIG. 13, the series of operations at block 652 can include: (a) determining, based on the first confidence metrics, a subgroup of system contexts from the plurality of system contexts that are likely to be the current system context at block 654, (b) analyzing the sets of filtering rules for the subgroup of system contexts to determine one or more common filtering rules between the sets of filtering rules for the subgroup of system contexts at block 656, (c) applying the one or more common filtering rules to the plurality of network messages to determine a portion of the subset of the plurality of network messages that are acceptable for the subgroup of system contexts at block 658, (d) forwarding, by the processor, each network message of the portion of the subset to the destination of the network message at block 660, and (e) buffering a remainder of the plurality of the network messages until determining the current system context based on the plurality of network messages received during the second portion of time at block 662.

Figure 14:
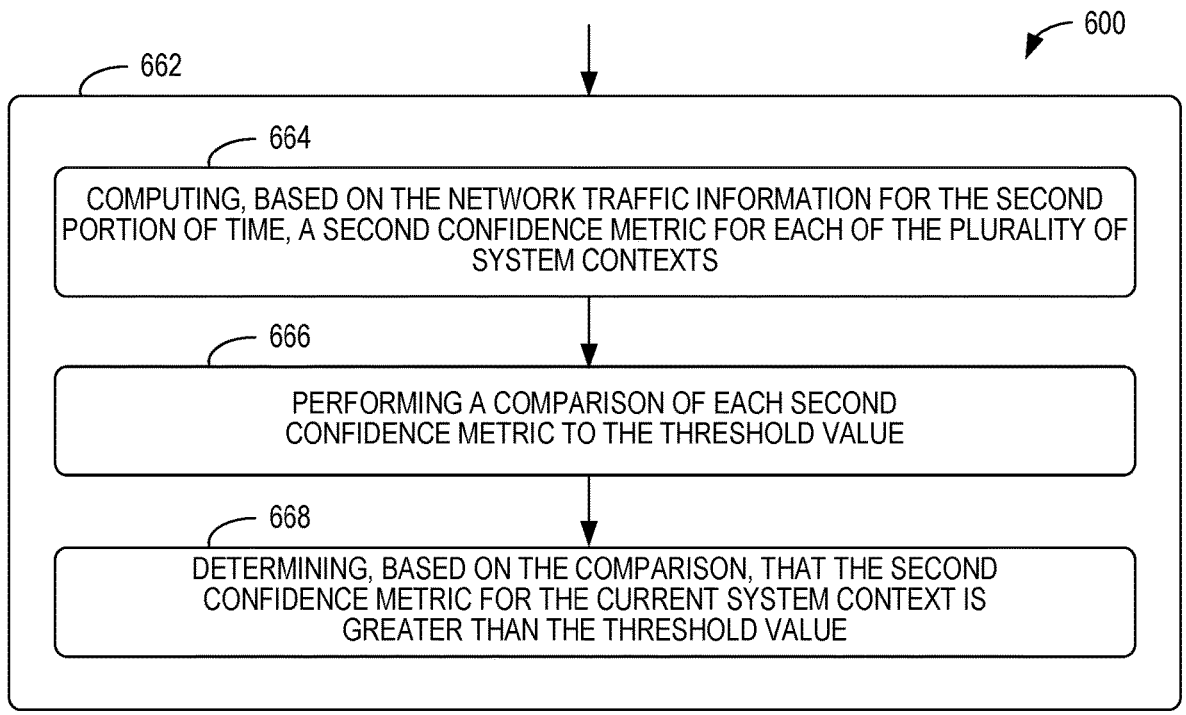
FIG. 14 illustrates a flow chart of an example process for operating an aerial vehicle that can be used with the process shown in FIG. 13.

As shown in FIG. 14, to determine the current system context based on the plurality of network messages received during the second portion of time at block 662, the process 600 can include (i) computing, based on the network traffic information for the second portion of time, a second confidence metric for each of the plurality of system contexts at block 664, (ii) performing a comparison of each second confidence metric to the threshold value at block 666, and (iii) determining, based on the comparison, that the second confidence metric for the current system context is greater than the threshold value at block 668.

Figure 15:
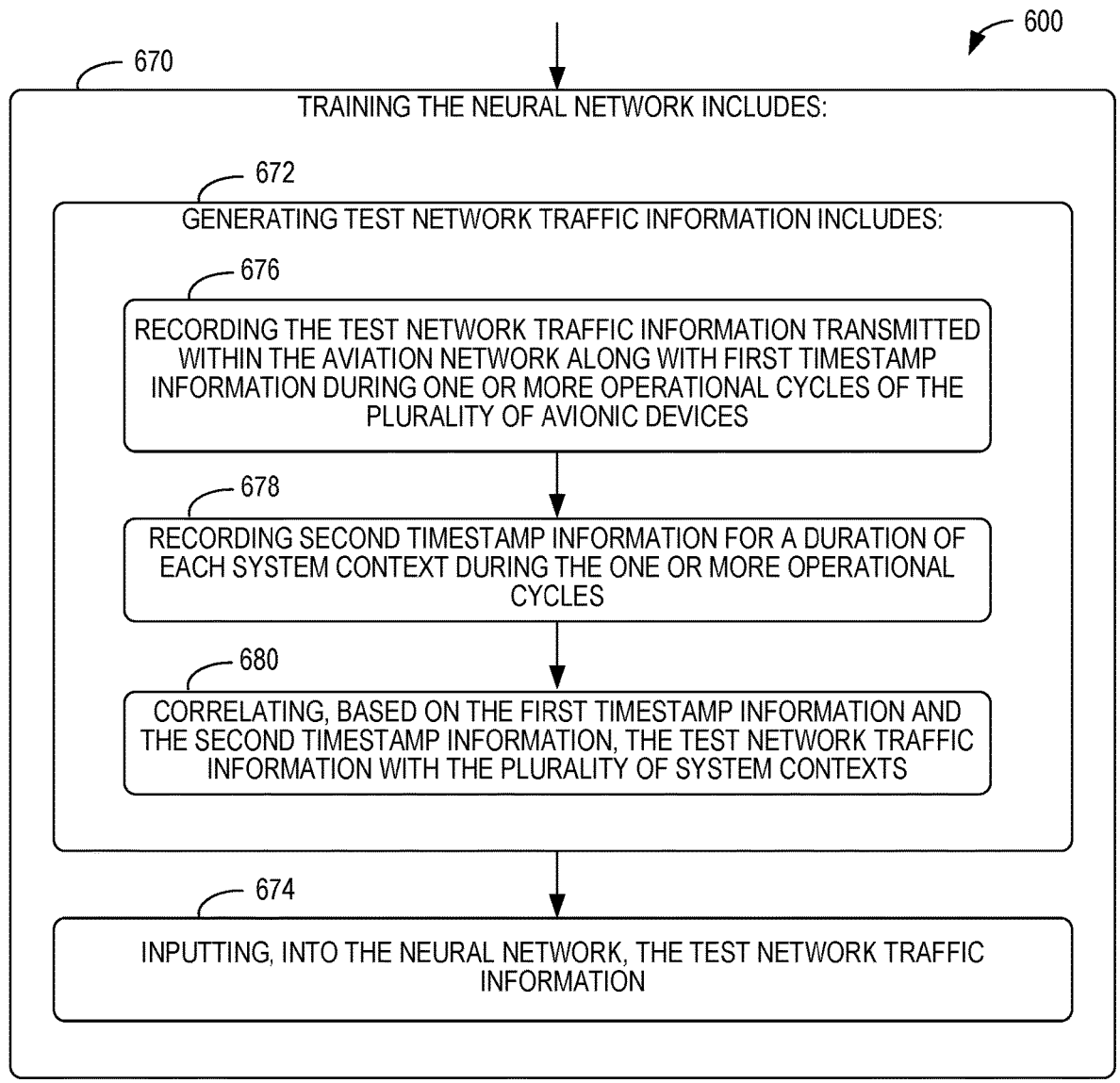
FIG. 15 illustrates a flow chart of an example process for operating an aerial vehicle that can be used with the process shown in FIG. 11.

As shown in FIG. 15, the process 600 can include training the neural network at block 670. To train the neural network at block 670, the process 600 can include generating test network traffic information at block 672 and inputting, into the neural network, the test network traffic information at block 674. Further, to generate the test network traffic information at block 672, the process 600 can include (i) recording the test network traffic information transmitted within the aviation network along with first timestamp information during one or more operational cycles of the plurality of avionic devices at block 676, (ii) recording second timestamp information for a duration of each system context during the one or more operational cycles at block 678, and (iii) correlating, based on the first timestamp information and the second timestamp information at block 680.

One or more of the blocks shown in FIGS. 6-15 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A method for filtering network messages in an aviation network based on a current system context, comprising:
    receiving, by a processor of a computer system, a plurality of network messages transmitted within an aviation network;
    analyzing, by the processor, the plurality of network messages to determine network traffic information;
    determining, by the processor and based on the network traffic information, a current system context from among a plurality of system contexts, wherein each of the plurality of system contexts indicates a respective aggregate status of a plurality of avionic devices in the aviation network, wherein each system context is associated with a respective one of a plurality of sets of filtering rules for a context-aware firewall;
    selecting, by the processor and based on the current system context, the set of filtering rules associated with the current system context from among the plurality of sets of filtering rules for the context-aware firewall;
    applying, by the processor, the selected set of filtering rules to the plurality of network messages to determine a subset of the plurality of network messages that are acceptable for the current system context; and
    forwarding, by the processor, each network message of the subset to a destination of the network message.

2. The method of claim 1, wherein analyzing the plurality of network messages to determine the network traffic information comprises:
    extracting, from a header of each network message, a pair of addresses comprising a source address and a destination address for the network message; and
    determining, for the plurality of network messages, an amount of network traffic between each pair of addresses over a period of time.

3. The method of claim 2, wherein determining, based on the network traffic information, the current system context comprises determining the current system context based on the amount of network traffic between each pair of addresses over the period of time.

4. The method of claim 3, wherein analyzing the plurality of network messages to determine the network traffic information comprises:
    extracting, from the header of each network message, a network port for the network message; and
    determining, for each network port, a percentage of the network traffic over the period of time, and
    wherein determining, based on the network traffic information, the current system context comprises determining the current system context based on the percentage of the network traffic for each network port over the period of time.

5. The method of claim 1, wherein the plurality of avionic devices comprise a global positioning satellite (GPS) system, a plurality of passenger devices, and a line replaceable unit (LRU) on-board an aircraft, and
    wherein determining, by the processor and based on the network traffic information, the current system context from among the plurality of system contexts comprises determining the current system context from among a group of system contexts comprising a power on context, a pre-flight context, an engine start context, an in-gate context, a taxi-out context, a takeoff context, a climb context, a cruise context, a descent context, an approach context, a rollout context, a taxi-in context, a go around context, an engine shutdown context, and a maintenance context.

6. The method of claim 1, wherein determining, based on the network traffic information, the current system context from among the plurality of system contexts comprises:
    inputting the network traffic information in a neural network; and
    using the neural network to determine, based on the network traffic information, the current system context from among the plurality of system contexts.

7. The method of claim 6, wherein using the neural network to determine, based on the network traffic information, the current system context from among the plurality of system contexts comprises:
    computing, using the neural network and based on the network traffic information, a confidence metric for each of the plurality of system contexts;
    performing a comparison of each confidence metric to a threshold value; and
    determining, based on the comparison, that the confidence metric for the current system context is greater than the threshold value.

8. The method of claim 6, further comprising training the neural network, wherein training the neural network comprises:
    generating test network traffic information, wherein generating the test network traffic information comprises:

recording the test network traffic information transmitted within the aviation network along with first timestamp information during one or more operational cycles of the plurality of avionic devices, recording second timestamp information for a duration of each system context during the one or more operational cycles, and correlating, based on the first timestamp information and the second timestamp information, the test network traffic information with the plurality of system contexts; and inputting, into the neural network, the test network traffic information.

9. The method of claim 1, wherein the plurality of network messages are received over a period of time comprising a first portion of time and a second portion of time, wherein determining the current system context comprises:

computing, based on the network traffic information for the first portion of time, a first confidence metric for each of the plurality of system contexts;

performing a comparison of each first confidence metric to a threshold value;

determining, based on the comparison, that the first confidence metrics are all below the threshold value;

responsive to determining that the first confidence metrics are all below the threshold value:

determining, based on the first confidence metrics, a subgroup of system contexts from the plurality of system contexts that are likely to be the current system context;

analyzing the sets of filtering rules for the subgroup of system contexts to determine one or more common filtering rules between the sets of filtering rules for the subgroup of system contexts;

applying the one or more common filtering rules to the plurality of network messages to determine a portion of the subset of the plurality of network messages that are acceptable for the subgroup of system contexts;

forwarding, by the processor, each network message of the portion of the subset to the destination of the network message; and buffering a remainder of the plurality of the network messages until determining the current system context based on the plurality of network messages received during the second portion of time.

10. The method of claim 9, wherein determining the current system context based on the plurality of network messages received during the second portion of time comprises:

computing, based on the network traffic information for the second portion of time, a second confidence metric for each of the plurality of system contexts;

performing a comparison of each second confidence metric to the threshold value; and determining, based on the comparison, that the second confidence metric for the current system context is greater than the threshold value.

11. A system for filtering network messages in an aviation network based on a current system context, comprising:

a memory that stores instructions; and a processor configured to execute the instructions to perform operations comprising:

receiving a plurality of network messages transmitted within an aviation network;

analyzing the plurality of network messages to determine network traffic information;

determining, based on the network traffic information, a current system context from among a plurality of system contexts, wherein each of the plurality of system contexts indicates a respective aggregate status of a plurality of avionic devices in the aviation network, wherein each system context is associated with a respective one of a plurality of sets of filtering rules for a context-aware firewall;

selecting, based on the current system context, the set of filtering rules associated with the current system context from among the plurality of sets of filtering rules for the context-aware firewall;

applying the selected set of filtering rules to the plurality of network messages to determine a subset of the plurality of network messages that are acceptable for the current system context; and forwarding each network message of the subset to a destination of the network message.

12. The system of claim 11, wherein the processor is configured to execute the instructions to operate as a neural network.

13. The system of claim 11, wherein analyzing the plurality of network messages to determine the network traffic information comprises:

extracting, from a header of each network message, a pair of addresses comprising a source address and a destination address for the network message; and determining, for the plurality of network messages, an amount of network traffic between each pair of addresses over a period of time, and wherein determining, based on the network traffic information, the current system context comprises determining the current system context based on the amount of network traffic between each pair of addresses over the period of time.

14. The system of claim 13, wherein analyzing the plurality of network messages to determine the network traffic information comprises:

extracting, from the header of each network message, a network port for the network message; and determining, for each network port, a percentage of the network traffic over the period of time, and wherein determining, based on the network traffic information, the current system context comprises determining the current system context based on the percentage of the network traffic for each network port over the period of time.

15. The system of claim 11, wherein the plurality of avionic devices comprise a global positioning satellite (GPS) system, a plurality of passenger devices, and a line replaceable unit (LRU) on-board an aircraft, and wherein the plurality of system contexts comprise a power on context, a pre-flight context, an engine start context, an in-gate context, a taxi-out context, a takeoff context, a climb context, a cruise context, a descent context, an approach context, a rollout context, a taxi-in context, a go around context, an engine shutdown context, and a maintenance context.

16. The system of claim 11, wherein determining, based on the network traffic information, the current system context comprises:

computing, based on the network traffic information, a confidence metric for each of the plurality of system contexts;

performing a comparison of each confidence metric to a threshold value; and determining, based on the comparison, that the confidence metric for the current system context is greater than the threshold value.

17. The system of claim 11, wherein the plurality of network messages are received over a period of time comprising a first portion of time and a second portion of time, wherein determining the current system context comprises:
computing, based on the network traffic information for the first portion of time, a first confidence metric for each of the plurality of system contexts;
performing a comparison of each first confidence metric to a threshold value;
determining, based on the comparison, that the first confidence metrics are all below the threshold value;
responsive to determining that the first confidence metrics are all below the threshold value:
determining, based on the first confidence metrics, a subgroup of system contexts from the plurality of system contexts that are likely to be the current system context;
analyzing the sets of filtering rules for the subgroup of system contexts to determine one or more common filtering rules between the sets of filtering rules for the subgroup of system contexts;
applying the one or more common filtering rules to the plurality of network messages to determine a portion of the subset of the plurality of network messages that are acceptable for the subgroup of system contexts;
forwarding, by the processor, each network message of the portion of the subset to the destination of the network message; and
buffering a remainder of the plurality of the network messages until determining the current system context based on the plurality of network messages received during the second portion of time.

18. The system of claim 17, wherein determining the current system context based on the plurality of network messages received during the second portion of time comprises:
computing, based on the network traffic information for the second portion of time, a second confidence metric for each of the plurality of system contexts;
performing a comparison of each second confidence metric to the threshold value; and
determining, based on the comparison, that the second confidence metric for the current system context is greater than the threshold value.

19. A non-transitory machine-readable medium having instructions embodied thereon, which, when executed by a processor of a machine, cause the machine to perform operations comprising:
receiving a plurality of network messages transmitted within a communication network;
analyzing the plurality of network messages to determine network traffic information;
determining, based on the network traffic information, a current system context from among a plurality of system contexts, wherein each of the plurality of system contexts indicates a respective aggregate status of a plurality of devices in the communication network, wherein each system context is associated with a respective one of a plurality of sets of filtering rules for a context-aware firewall;
selecting, based on the current system context, the set of filtering rules associated with the current system context from among the plurality of sets of filtering rules for the context-aware firewall;
applying the selected set of filtering rules to the plurality of network messages to determine a subset of the plurality of network messages that are acceptable for the current system context; and
forwarding each network message of the subset to a destination of the network message.

20. The non-transitory machine-readable medium of claim 19, wherein the communication network is an aviation network comprising one or more avionic devices.

21. The non-transitory machine-readable medium of claim 19, wherein the communication network is an autonomous vehicle network comprising an autonomous vehicle.

* * * * *